1,786,894

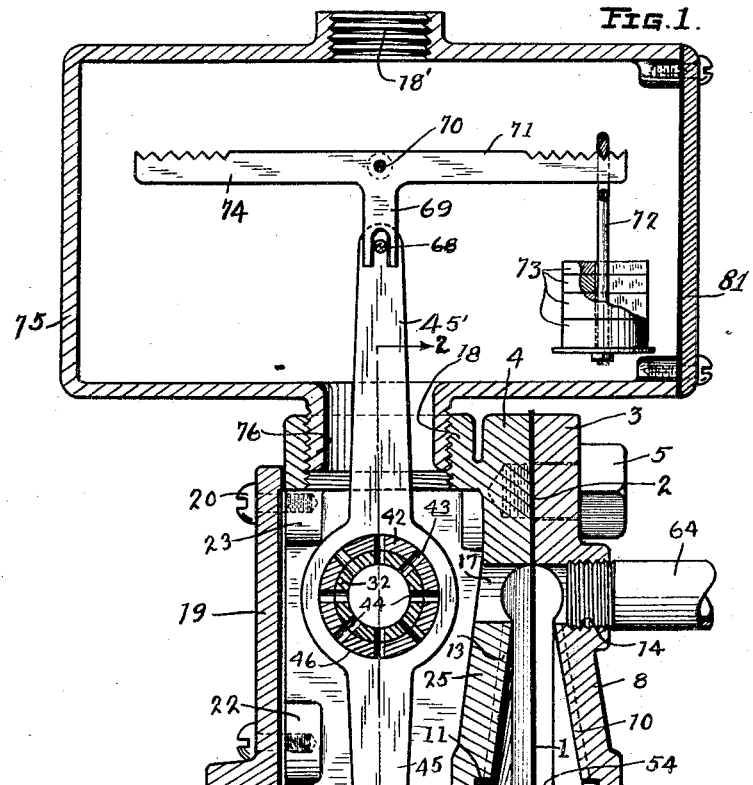
Dec. 30, 1930.  C. A. BROWN  1,786,894
FLUID CONTROLLER
Original Filed Jan. 29, 1926  2 Sheets-Sheet 1
Inventor
Charles Arthur Brown
By Frank M. Slough
His Attorney Dec. 30, 1930.  C. A. BROWN  1,786,894
FLUID CONTROLLER
Original Filed Jan. 29, 1926   2 Sheets-Sheet 2
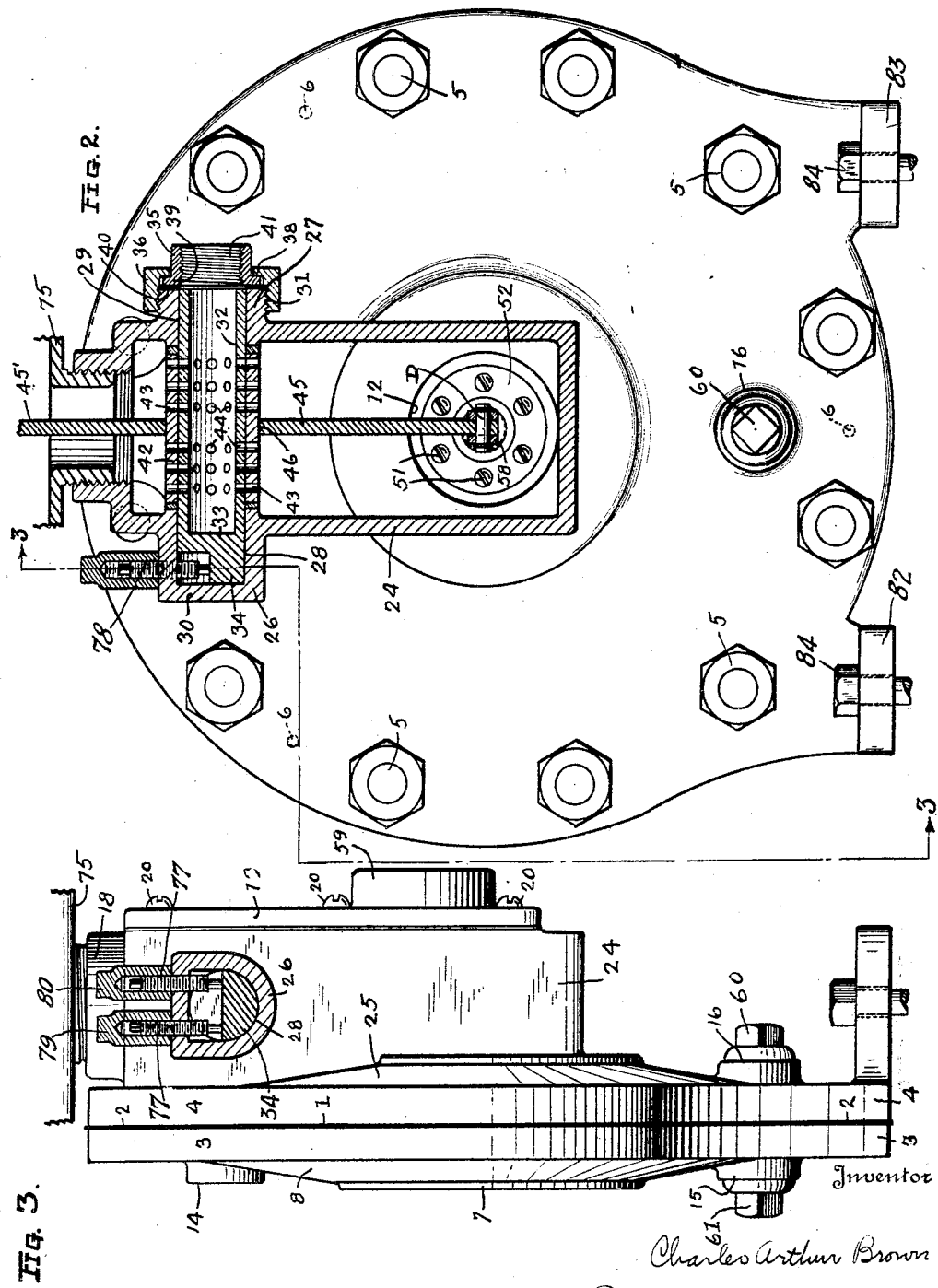
Inventor
Charles Arthur Brown
By Frank M. Slough
His Attorney Patented Dec. 30, 1930

UNITED STATES PATENT OFFICE

CHARLES ARTHUR BROWN, OF LORAIN, OHIO

FLUID CONTROLLER

Application filed January 29, 1926, Serial No. 84,547. Renewed November 7, 1923.

My invention relates to fluid pressure operated controllers, one of its objects being to accomplish a more accurate control of a fluid flow or a fluid pressure responsive to governing fluid pressure, than has hitherto proved feasible in practice.

Another object of my invention is to accomplish the reliable governing actuation of a fluid controlling valve by movements of a diaphragm separating an ungoverned from a governed fluid under pressure, and wherein one of the pressures is effected by a liquid.

Another object of my invention is to accomplish highly accurate automatic governing of a fluid pressure or flow responsive to movements of a diaphragm from a balanced position, acted upon by opposing fluid pressures to govern one of the said fluid pressures, whereby relative variations in the effective pressures exerted on the two sides of the diaphragm are accompanied by a resultant compensating variation in at least one of the said pressures to tend to restore the diaphragm to normal balanced position.

Another object of my invention is to provide for more uniform distribution of actuating liquid pressure over the entire diaphragm area.

Other objects of my invention and the invention itself will become apparent as the following description of an embodiment of my invention progresses, and in which description reference will be had to the accompanying drawings forming a part of this specification.

Referring to the drawings:

Fig. 1 shows, in medial section, apparatus embodying my invention;

Fig. 2 is a section taken on the line 2—2 of Fig. 1;

Fig. 3 is a section taken on the line 3—3 of Fig. 2; and

Fig. 4 shows, diagrammatically, a system in which my invention may find a use.

Referring now to all of the figures of drawing, in all of which like parts are designated by like reference characters, at 1, I show a diaphragm which may be made of many different materials, varying widely in composition, but which preferably comprises a sheet of rubber compound material, the said diaphragm being clamped at its border 2 between a peripheral flange 3 of a front plate 8 and a peripheral flange 4 of a rear plate 25. These flanges are secured together, with the diaphragm clamped between them by its border portion 8, by a series of bolts 5, a plurality of dowel pins 6 being first inserted between the flanges and recessed in openings first provided therein, for the purpose of properly axially and radially aligning the front and rear plates. The front plate is dished forwardly at its more central portions and, in the embodiment illustrated, comprises a central portion 7 united to the flanges by an inclined portion 8. The central portion 7 preferably provides an inner recess 9 and radial grooves 10 are provided, leading from the recess 9 to the space adjacent the peripheral portions of the diaphragm. The rear plate is likewise recessed at 11 in its central portion, which has an opening 12 extending therethrough, there being likewise radial grooves 13 extending between the recess 11 and the space adjacent the peripheral portions of the diaphragm. The front plate is pierced at 14 and 15 and the rear plate is pierced at 16 and 17, the openings thereby provided through the front and rear plates being disposed adjacent the extreme peripheral portions of the free part of the diaphragm.

Extending from the rear plate 25 is an integrally formed box portion 24, preferably having an internally threaded boss opening 18 at its top, and provided with a cover 19 bolted to it by means of bolts, shown at 20, which pass through openings 21, 22 and 23 in the border portions of the cover into threaded recesses in bosses of the box. Through the central perforation 12 of the back plate, a liquid may be communicated between the space adjacent the diaphragm and the interim of the box and exert a pressure upon the rear face of the diaphragm. The box 24 is provided with lateral bosses 26 and 27, each of which is preferably provided with cylindrical inner walls 28 and 29, respectively; the boss 26, moreover, has an end wall closure 30, and the boss 27 is preferably externally threaded at 31.

A cylindrical valve element 32, having an end wall 33, is journaled at 28 and 29 within the cylindrical walls of the bosses 26 and 27, the end wall 33 having a longitudinally extending flattened flange end 34. Screw threaded through a side wall of the boss 26, I provide a pair of transversely arranged, spaced adjusting screws 77 and 78, capped by lock nuts 79 and 80, respectively. By suitably adjusting the screws to cause their ends to contact with the flattened surface of the end flange 34 of the valve element 32, the valve seat may be radially adjusted to properly dispose its openings 44 relative to radial openings 43 of a concentric rotatable valve 42, which is in close-fitting telescoping relation over the element 32. The open end of the valve element 32 is adapted to be joined to a pipe coupling element 35, by an inwardly flanged clamping ring 36 threaded on to the exterior threaded surface 31 of the boss 27, its inturned annular flange 38 contacting with the outwardly extending annular peripheral flange 39 of the coupler 35, and a gasket 40 being interposed between the flange and the end of the boss 27.

The cylindrical valve 42 and the cylindrical valve element 32 are each provided with pairs of alignable preferably radially extending oppositely disposed openings which may vary in number and size from a pair of oppositely disposed openings to a large number of such pairs of openings; in the embodiment of my invention, which I have illustrated herein, I show, in each of the elements 42 and 32, 48 perforations, each perforation of the one element being capable of substantial axial alignment with the perforations of the other element. These axially disposed perforations may be arranged in any suitable manner, and I preferably so arrange these perforations that upon rotation of the valve 42 relative to the valve element 32, all of the perforations will come into alignment at the same time, and the number of perforations in alignment may be varied by plugging up one or more pairs of openings, so that at the maximum angular displacement, the resistance to fluid flow through the aligned openings will be, preferably, at a minimum.

The number of the openings, therefore, and their area may be, in the construction herein disclosed, effectively varied by the plugging up or uncovering of covered perforations, as may be desired, to increase the resistance to fluid flow through the aligned perforations or to decrease such resistance. In the embodiment of my invention illustrated, the perforations in the valve and valve seat are arranged in longitudinally extending rows, each row axially disposed to its opposed row, at an angle of 180°. Such perforations are shown at 43 for the valve and at 44 for the valve element.

Rigidly secured to the exterior of the valve 42, I provide a valve operating lever 45, which is pierced in its upper end at 46 to admit the valve 42, which is tightly and relatively non-rotatably fitted within the opening so provided. The lower end of the lever 45 is connected to the diaphragm 1 by a connecting rod 47 and connecting link 48, which is screw threaded on to one end of the rod 47; a ball and socket connecting mechanism, comprising a ball 49 rigidly secured on to the other end of the rod 47, and carried within a recess of a flanged socket element 50 which is secured to the diaphragm 1 by machine screws 51, a clamping ring 52 being interposed between the under sides of the heads of the screws 51 and the diaphragm, the annular flange 53 of the socket element 50 engaging the diaphragm at its opposite side.

Dished cups 54, reversely disposed on opposite sides of the diaphragm, are clamped between the ring 52 and the flange 53 by the bolts 51, a central recessed stem portion 55 of the socket element 50 being projected rearwardly from the flanged portion 53 through aligned central openings in the dished cups. A fluid sealing gasket 56 is preferably provided between the adjacent surfaces of the flange 53 and the dished cup 54. A centrally perforated retaining nut 57 having exterior threads for engagement with the internally threaded wall of the recessed stem 55 of the socket element, is screw threaded within the socket recess of the said stem to retain the ball-headed end of the connecting rod 47 in the socket. The externally threaded nut 57 is turned into the recess just far enough so as to prevent appreciable lost motion of the ball within the socket in directions axially of the diaphragm, but to permit a certain amount of swiveling, or rolling, of the ball within the socket to compensate for slight misalignment of the rod 47. A lock nut 58 is screw threaded on to the threaded end of the connecting rod 47 to lock the link 48 securely thereon. The rim portions of the cup elements 54 are disposed towards the flattened centrally recessed wall surfaces of the front and back plates and form stops adapted to contact therewith upon movements of the diaphragm of appreciable amplitude.

A hollow boss 59 is provided and is preferably internally threaded for connection of a pipe or plug thereto, whereby in the case of a pipe, fluid communication may be had through the boss opening between such a pipe and the interior of the box 24. Communication with the interior of the box 24 and a pipe connected to the internally threaded coupling 41 may only be had through the aligned axially disposed openings through the walls of the valve 42 and valve element 32, and the alignment, non-alignment and partial alignment of such openings are controlled by movements of the diaphragm 1 rotating the valve 42 by connecting linkage comprising the joined lever 45 and connecting rod 47, connected respectively to the valve 42 and the diaphragm 1. At 60 and 61, I show screw threaded removable plugs for the openings 15 and 16, whereby these openings may be closed, or opened for various purposes such as cleaning out of the bottom portions of the fluid containing spaces adjacent the diaphragm, or to communicate fluid pressures to or from the spaces.

Although my invention may not be so limited in all of its phases, I describe the embodiment of my invention herein illustrated as being placed in such a position that the opening 14 will be positioned directly over the opening 15, the diaphragm 1 being disposed in a vertical plane. In order to illustrate one use to which my invention may be put, and to illustrate some of the advantages accruing from the use of my invention, in Fig. 4, I show, generally diagrammatically, a portion of a fluid system in which my invention may find a use and in which is incorporated a mechanism corresponding to that illustrated and described herein as embodying my invention.

Referring to Fig. 4, at 62, I show a source of fluid pressure which may be a variable pressure, communicating with the fluid pressure cell 63 in front of the diaphragm 1 by a conduit 64 making connection with the interior of the said cell through the opening 14. At 65, I show a second source of fluid pressure, such as a water main adapted to communicate water under pressure through a conduit 66, through the opening 18 of the box 24, whereby such water will be brought into contact with the rear surface of the diaphragm 1 and its pressure exerted upon it in an opposite direction to the pressure exerted upon it by the first pressure, to tend to move it oppositely to the direction of movement it otherwise would take under the sole influence of pressure in the cell 63. At 42 and 32, I indicate the valve and valve seat elements, respectively, whereby fluid may escape from the box 24 whenever the diaphragm 1 is moved out of its normal position of equipoise assumed whenever the pressures exerted upon its two sides are equal.

An orifice restriction 67 is preferably provided in conduit 66 to limit the rate of flow through the conduit 66, so that upon an excess of diaphragm actuating pressure on the rear surface of the diaphragm over that exerted on its front surface to accomplish a departure from balanced position of the diaphragm 1 to open the valve, water will be vented from the box more rapidly than water may be admitted under pressure through the orifice to effect a reduction of pressure in the cell 24, to restore the diaphragm 1 to balanced position.

I sometimes may provide the device of my invention with diaphragm biasing means, such as illustrated, wherein an extension of the lever 45, illustrated at 45', projects upwardly through the opening 18, and a pin 68 carried near the end of the extension 45' projects between the forks of a bifurcated crank lever 69, which is pivoted at 70 and has an arm 71 projecting laterally therefrom. Any number of weights 73, which may vary in size, are supported on one of the lever arms 71 or 74 at various points thereon by a supporting stirrup 72 adapted to be hung on to either arm. Through stresses communicated through the crank lever 69 and the lever 45 and rod 47, when the weights are supported by the arm 71, the diaphragm 1 will be biased toward a more forward position so that in such a case the fluid pressure required in the cell at the front of the diaphragm to balance a fluid pressure at the rear of the diaphragm will be less than the pressure at the rear of the diaphragm by a predetermined amount of pressure equivalent to that supplied by the predetermined weight 73 and connecting levers. The weight carrying stirrup 72 may be transferred from the arm 71 to the arm 74 whenever it is desired to bias the diaphragm to a rearward position, whereby the diaphragm may be maintained in balanced position by a lower value of fluid pressure on its forward side than on its rear side.

By virtue of this arrangement of weights and levers, it is practicable to maintain a second fluid pressure commensurable to a first fluid pressure but different therefrom by a predetermined amount of pressure more or less than the first.

The extension 45' of the lever 45 and crank lever 69, with its arms and depending weights, are preferably enclosed in a housing 75 which may communicate with the interior of the box 24 through a depending threaded boss 76 screw threaded within the threaded opening 18 of the box 24. The housing 75 may have a threaded opening 18' corresponding to the opening 18 for communicating pressures between the exterior and interior of the housing.

I have hereinabove described an embodiment of my invention as operating under a condition wherein in order to establish a balanced position of the diaphragm 1, fluid pressure must be vented from the box 24; my invention, however, is not limited to such use but may be also advantageously employed in systems wherever it is desirable to increase the pressure at the rear of the diaphragm, intermittently, in order to restore equality of pressures exerted upon the diaphragm. In such a case the valve may be adjusted so that it will move toward open position whenever the fluid pressure at the rear of the diaphragm has become so depleted that upon the two sides of the diaphragm differing pressures will be exerted. In such a case, a source of fluid pressure of a substantially higher value than that existing at the front of the diaphragm 1 will be communicated to the opening 41 leading to the interior of the valve seat 32 and will be communicated through the valve openings to the fluid cell at the rear of the diaphragm whenever and if the diaphragm is pushed rearwardly by an excess of pressure on its forward side. In such a case, the opening of the valve consequent to the movement of the diaphragm will admit fluid at a higher pressure to reenforce the pressure at the rear of the diaphragm and restore the diaphragm to equipoise position, wherein the valve will again be closed. This condition will be maintained as long as there is no loss of fluid pressure in the cell at the rear of the diaphragm.

Where water or other liquid is used to exert pressure at the rear of the diaphragm, air commonly finds its way into a pressure cell, such as that existing to the rear of the diaphragm, and in such a case it will rise to the top wall of such a pressure cell. By the provision of the passage 17 leading from the top wall of the cell, a vent is provided which will continuously permit the escape of air upwardly in the liquid, whence it will escape through the radial ports or openings 43—44 of the valve 42 and valve seat 32, the valve and seat being positionally related to the passage 17, so that at least one or more of the openings 43 are at a higher level than the passage 17; or the air may escape through the opening 18 of the box 24, and the rear of the diaphragm, in such a case, will be left completely contactive over its entire surface with the water or other liquid exerting pressure thereupon, and the pressure at all parts of the diaphragm will therefore be made more uniform than would be the case were the upper portion of its area exposed to contact with a body of trapped air. In like manner, the opening 74 for the pressure cell in front of the diaphragm is disposed at the top of the cell and in service the pipe 64 would lead to it from above the plane of the upper part of the cell space, so that air would escape from the cell upwardly through such pipe. For some purposes, when it is desirable to use the controller in inverted position, the plugs 60 and 61 may be replaced by upwardly extending pipes and plugs inserted in the openings 14 and 18', the mode of operation being similar to that above described and the trapping of air in contact with the diaphragm avoided by providing vents for air from the cells adjacent the diaphragms comprising the pipes substituted in such openings. Such vented air is conveyed by passages such as that shown at 17 or at 14 to receptacles of such escaping air, such as the upper part of the box 24, housing 75, and the conduits communicating therewith at the opening 18', or in the case of the opening 14, the pipe 64 will convey air to the conduits upwardly disposed relative thereto, and which in the sense intended comprise a receptacle for such vented air.

One or more gasketed cover plates, such as 81, may be provided for the lever housing 75 to permit access to the beam arms 74 and 71 for adjusting weight thereon or removing weight therefrom; the cover plate 19 permits access to the interior of the box 24; perforated lugs 82 and 83 permit the securing of the controller to a fixed support by bolts or screws 84 projected through the perforations.

Having thus described my invention in a single specific embodiment for the purpose of explaining the invention, I am aware that numerous and extensive departures may be made from the invention herein illustrated and described, but without departing from the spirit of my invention.

I claim:

1. In a controller of the class described, a rotatable valve, a cylindrical concentric seat for the valve, said valve and seat each having a pair of alignable openings through their walls, a pair of fluid pressure cells, a diaphragm dividing the cells and exposed to the pressures of fluid contained in the cells, one of the cells being adapted to contain a liquid under pressure, a fluid passage adapted to convey, in a continuously upward direction, air from the liquid in the said liquid containing cell from all portions of that side of the diaphragm contacting with the liquid to one of the said valve openings, said one valve opening being disposed above the level of the topmost portion of the diaphragm surface in engagement with the liquid in the liquid containing cell.

2. In a controller of the class described, a rotatable valve, a cylindrical concentric seat for the valve, said valve and seat each having a pair of alignable openings through their walls, a pair of fluid pressure cells, a diaphragm dividing the cells and exposed to the pressures of fluid contained in the cells, one of the cells being adapted to contain a liquid under pressure, a fluid passage adapted to convey, in a continuously upward direction, air from the liquid in the said liquid containing cell from all portions of that side of the diaphragm contacting with the liquid to one of the said valve openings, said one valve opening being disposed above the level of the topmost portion of the diaphragm surface in engagement with the liquid in the liquid containing cell, each set of alignable openings of the two pairs of openings through the walls of the valve and its seat, being disposed at an angle of 180° to the other set of alignable openings.

3. In a controller of the class described, the combination with a fluid casing, of a rotary valve and diaphragm disposed therein, a link adapted to communicate movements of the diaphragm to rotate the valve, said valve having at least one port opening thereof, when in opened position, disposed above a cylindrical co-axial projection of the effective periphery of the diaphragm when the diaphragm periphery is disposed in a vertical plane, said casing providing a gas-conducting passage between the diaphragm periphery and the valve opening, having no portion of its upper wall disposed below the uppermost portion of such a cylindrical projection of the diaphragm periphery.

4. In a controller of the class described, the combination with a fluid casing, of a rotary valve and diaphragm disposed therein, a link adapted to communicate movements of the diaphragm to rotate the valve, said valve having at least one port opening thereof, when in opened position, disposed above a cylindrical co-axial projection of the effective periphery of the diaphragm when the diaphragm periphery is disposed in a vertical plane, said casing providing a gas-conducting passage between the diaphragm periphery and the valve opening, having no portion of its upper wall disposed below the uppermost portion of such a cylindrical projection of the diaphragm periphery, said casing providing a fluid-containing cell on its side opposite the said passage, whereby movements of the diaphragm communicated by the link to the valve may actuate the valve to reestablish equality of fluid pressures on its two sides upon departures from equality between such pressures.

5. In a fluid controller, a fluid tight casing, a diaphragm, said casing being divided into a pair of fluid pressure cells by said diaphragm and adapted to be so disposed as to place the diaphragm in a substantially vertical plane, individually rotatable relatively telescoped valve and valve seat elements in one of said cells and having alignable valve ports in their telescoping walls, a bearing for supporting the elements within the casing, adjusting means to adjustably vary the angular relationship of the rotatable seat element with respect to the casing, a link to communicate lateral movements of the diaphragm to the valve to effect rotary movement thereof, said valve and valve seat being disposed at such an elevation relative to the diaphragm, and the inner walls of said valve containing cell being so formed that at least one of the pairs of valve ports are substantially located above the uppermost movable portion of the diaphragm, and to permit continuous upward movement of fluid from such uppermost diaphragm portion to said ports.

6. In combination, a casing, a diaphragm dividing said casing into two fluid pressure chambers, a rotatable valve element and a rotatable valve seat element in one of said pressure chambers, said valve and valve seat elements being relatively telescoped one over the other, the inner element having a fluid conducting bore and said elements having alignable ports through their walls upon a given relative angular adjustment of the elements, a link to communicate movements of the diaphragm to the valve to effect a rotary movement thereof to the valve element, and means manually operable from the outside of the casing for rotatably adjusting the valve seat element while flow is occuring through aligned ports of said valve and seat elements, under the control of said diaphragm.

7. In a fluid pressure operated valve mechanism, a fluid casing relatively telescoped relatively rotatable valve and valve seat elements, valve port openings through the telescoped walls of said elements alignable upon relative rotary movement of the elements, a diaphragm vertically dividing the casing into a pair of pressure cells, a bearing for supporting said elements in one of said cells a link for communicating lateral movements of the diaphragm to one of said elements, and means projected through a wall of the casing and operable from the exterior thereof for rotatably adjusting the position of the other element.

8. In a fluid pressure operated valve mechanism, a fluid casing relatively telescoped relatively rotatable valve and valve seat elements, valve port openings through the telescoped walls of said elements alignable upon relative rotary movements of the elements, a diaphragm vertically dividing the casing into a pair of pressure cells, a bearing for supporting said elements in one of said cells, means manually operable from the outside of the casing for varying the rotatable adjustment of said valve seat element relative to the valve element, and a link for communicating lateral movements of the diaphragm to the valve element, said valve containing cell comprising a fluid passage adapted to effect continuous upward movement of rising gases from the upper portion of the diaphragm to at least one of said valve ports.

9. In combination, a casing, a diaphragm dividing said casing into two fluid pressure chambers, a rotatable valve element and a rotatable valve seat element in one of said pressure chambers, said valve and valve seat elements being relatively telescoped one over the other, the inner element having a fluid conducting bore and said elements having alignable ports through their walls upon a given relative angular adjustment of the elements, a link to communicate movements of the diaphragm to the valve to effect a rotary movement thereof to the valve element, and means manually operable from the outside of the casing for rotatably adjusting the valve seat element while flow is occurring through aligned ports of said valve and seat elements under the control of said diaphragm, and means continuously exerting a predetermined constant force tending to effect a rotary movement of the diaphragm actuated valve element to open or close said valve independently of the fluid pressure on the two sides of the diaphragm.

10. In a controller of the class described, the combination with a fluid casing, of a rotary valve and diaphragm disposed therein, a rotary valve seat for the valve disposed in telescoped relationship to the valve, said valve and seat having alignable port openings through their telescoped walls, a link adapted to communicate movements of the diaphragm to rotate the valve, said valve having at least one port opening therein, when in opened position disposed above a cylindrical co-axial projection of the effective periphery of the diaphragm when the diaphragm periphery is disposed in a vertical plane, said casing providing a gas conducting passage between the diaphragm periphery and the valve opening, having no portion of its upper wall disposed below the uppermost portion of such a cylindrical projection of the diaphragm periphery.

11. In a fluid pressure operated valve mechanism, a casing, a diaphragm dividing the casing into a pair of pressure cells, a valve mechanism comprising a pair of tubular relatively telescoped relatively rotatable valve elements, the lateral walls of the elements being in close-fitting engagement and having valve port openings therethrough, openings of the one element being alignable with openings of the other element upon relative rotation of the elements, a link adapted to communicate movements of the diaphragm to one of said elements to rotate it relative to the other element, adjusting means having a portion projected through a wall of the casing and manually operable from the exterior thereof to secure said other element in various rotative adjusted positions to vary the degree of alignment of openings effected upon a predetermined small movement of the diaphragm communicated to the other element.

In testimony whereof I hereunto affix my signature this 2nd day of January, 1926.

CHARLES ARTHUR BROWN.